United States Patent [19]

Kato et al.

[11] 4,032,020
[45] June 28, 1977

[54] ARTICLE EXCHANGING APPARATUS

[75] Inventors: Shozo Kato; Yutaka Takahashi, both of Nagoya; Yorio Miyaji, Osaka; Naomitsu Kondo, Osaka; Mikio Fukumoto, Osaka, all of Japan

[73] Assignees: Sumitomo Chemical Company, Limited; Kabushiki Kaisha Miyazaki Tekkosho, both of Osaka, Japan

[22] Filed: Apr. 7, 1975

[21] Appl. No.: 565,714

[30] Foreign Application Priority Data

Apr. 5, 1974  Japan .............................. 49-39203

[52] U.S. Cl. .................. 214/1 BB; 212/2; 214/2; 214/18 N; 176/30; 294/86 A
[51] Int. Cl.² ........................................ B66C 13/16
[58] Field of Search ........ 214/2, 18 N, 1 BB, 1 BT, 214/1 CM; 212/2; 294/86 A; 176/30

[56] References Cited

UNITED STATES PATENTS

| | | | |
|---|---|---|---|
| 3,422,967 | 1/1969 | Aron | 214/1 BB |
| 3,534,355 | 10/1970 | Fathauer | 212/2 X |
| 3,597,317 | 8/1971 | Isaac | 214/18 N |

*Primary Examiner*—Frank E. Werner
*Attorney, Agent, or Firm*—Hall & Houghton

[57] ABSTRACT

An article exchanging apparatus for withdrawing a consumed article from a processing unit and replacing it with a fresh article is provided in which the fresh article is easily placed on the same level in the processing unit by incorporating weight actuated switch means, means for detecting the level at which the consumed article was removed and converting same to signal means and level indicating and measuring means for receiving the generated signal means to indicate the level at which the consumed article was removed and thereafter enabling the placing of the fresh article at the same level as the consumed article by adjustment to correspond to the generated signal value.

4 Claims, 3 Drawing Figures

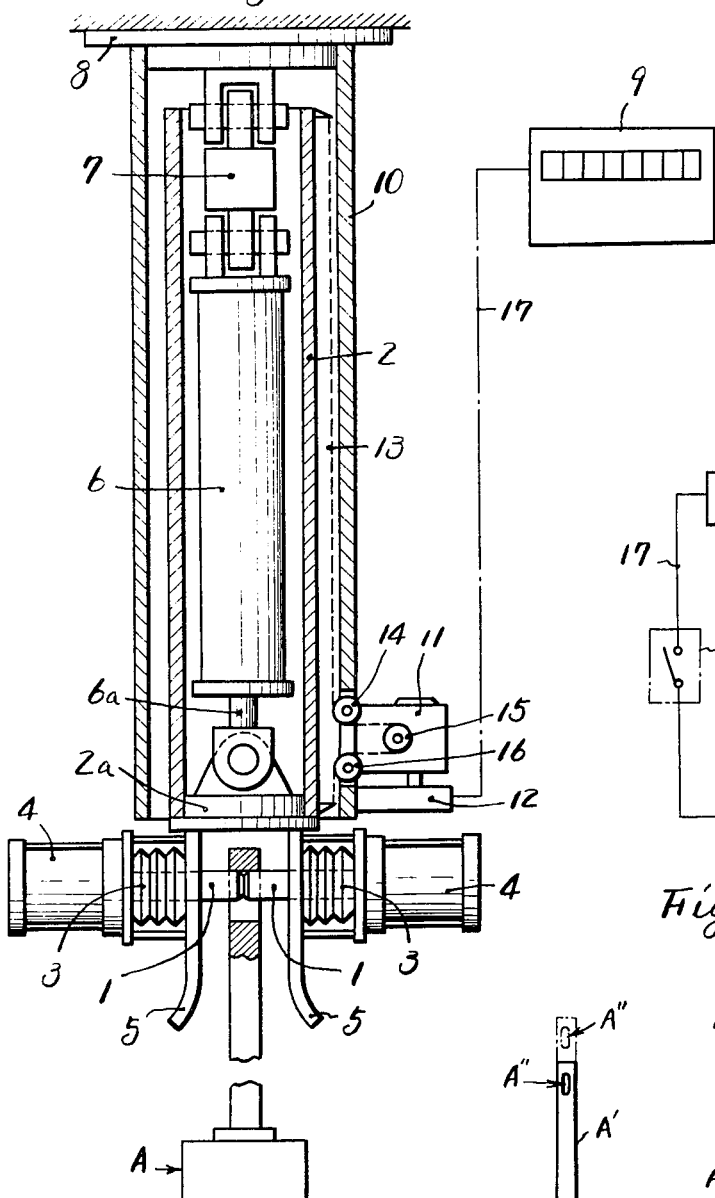
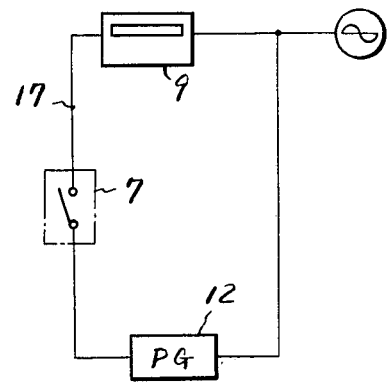
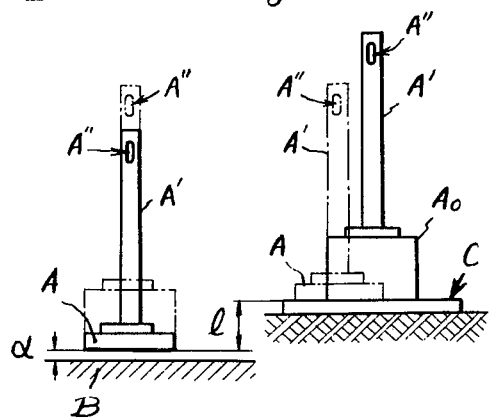

ARTICLE EXCHANGING APPARATUS

BACKGROUND OF THE INVENTION a. Field of the Invention

The present invention relates to an article exchanging apparatus for use where accuracy of placement level is required. For example, it may be used for exchange of a spent anode for a fresh anode in an electrolytic furnace for aluminum.

b. Description of the Prior Art

Heretofore, exchange of a spent anode in an electrolytic furnace for aluminum has been carried out by gripping the spent anode on the electrolytic furnace by means of an anode gripping member liftably attached to an overhead traveling crane, moving said crane to a spent anode storage location where said member releases said spent anode and then grips a fresh anode, and moving the crane back to its initial position over the electrolytic furnace so that the fresh anode may be placed at the position where the spent anode was previously placed. In this case, however, it is necessary for the exchange to ensure that the placement level of the lower surface of the fresh anode will coincide with the placement level of the lower surface of the spent anode. Heretofore, this has been done by resorting to eye measurement on the part of the crane operator. Such conventional procedure is not satisfactory in that the placement level of the fresh anode can be inaccurate and that the high technique and severe attention are required of the crane operator. Moreover, fine adjustment of the placement level takes a long period of time.

SUMMARY OF THE INVENTION

The present invention has been accomplished with a view to eliminating the above described disadvantages of the prior art. Thus, according to the present invention, exchange of an old article for a fresh one is performed by providing a level meter which is arranged so that it is operable only when subjected to the weight of an article and which, therefore, is inoperable under no-load conditions, means for vertically raising and lowering articles, said level meter being operatively associated with said means so as to be operated by the upward and downward movement of said means, transferring the old article to another location while using as a guide value the level meter reading recorded at the place where the old article has been gripped, performing exchange of the old article for a fresh article on the same level, and moving the fresh article to the position previously assumed by the old article until the reading on said level meter reaches said guide value.

BRIEF DESCRIPTION OF THE DRAWING

FIG. 1 is a side view in longitudinal section showing an embodiment of the present apparatus;

FIG. 2 is an electric signal input circuit diagram showing an example of a level meter according to the present invention; and FIG. 3 is a view explanatory of the exchanging operation of the present apparatus.

DETAILED DESCRIPTION OF THE INVENTION

The article exchanging apparatus of the present invention will be attached to an apparatus which is movable horizontally or in a direction parallel with the ground, such as an overhead traveling crane. The article exchanging apparatus is provided with means for vertically raising and lowering articles, said means having article gripping means attached thereto. Said lifting means is suspended at its base from a horizontally movable apparatus, such as an overhead traveling crane, through a load switch, and said article gripping means is secured to the movable portion of said lifting means. The vertical movement of the movable portion of said lifting means is detected by mechanical or electrical means or a combination thereof. Such movement of the movable portion is measured and indicated by level measuring and indicating means, which is adapted to indicate the vertical displacement of an article in terms of a plus or minus value with respect to a fixed reference level value, the measuring and indicating action thereof taking place only when the load switch is in ON position. The load switch is arranged so that it is rendered ON when said lifting means grips an article with the load of the latter acting on the lifting means and that it is OFF when there is no article load acting on said lifting means. As a result, the level measuring and indicating means will perform the measuring and indicating operation only when an article is grippped and vertically moved. The present invention carries out exchange between fresh and old articles by mounting them on an article mounting table having the same level throughout.

A concrete form of the present invention will now be described with reference to the accompanying drawing.

In FIG. 1, latches 1 serving to grip an article A are attached to part of a lifter 2 in such a manner that they can be opened and closed. Thus, usually the latches 1 are adapted to grip the article A by Belleville springs 3 and to be opened by air cylinders 4 when necessary, said air cylinders being attached to the lower surface of the base plate portion 2a of the lifter 2 through attachment plates 5.

The lifter 2 is connected to a lifting device 6, which, in the illustrated example, is in the form of a hydraulic cylinder having a piston rod 6a whose lower end is connected to the upper surface of the base 2a of the lifter 2.

The lifting device 6 is adapted to vertically raise and lower the article A through the intermediary of the lifter 2 and latches 1. The lifting device 6 is suspended from a base plate 8 through a load switch 7. The base plate 8 is connected to an apparatus which is movable horizontally or in a direction parallel with the ground, such as an overhead traveling crane.

The load switch 7 serves to close the electric signal input circuit of a level measuring and indicating device 9 such as a digital counter to be later described when subjected to the weight load of the article A as the latter is gripped by the latches 1. Thus, it is preferable to provide the switch with load setting means allowing change or adjustment of the switch-closing point determined by a weight load applied to the switch. In this connection, however, it is essential to set the load switch 7 so that it will never close under the total weight of the lifting device 6, lifter 2, latches 2, air cylinders 4, attachment plates 5 and other parts attached thereto.

The base plate 8 has attached thereto a guide sleeve 10 surrounding the lifter 2. Means for detecting the vertical displacement of the lifter 2 is disposed between said guide sleeve 10 and the lifter 2.

The detecting means mentioned above is shown in FIG. 1 as comprising a chain 13 and sprocket wheels 14, 15 and 16 for imparting a rotation to a speed reducer 11 adapted to actuate a pulse generator 12. Thus, the chain 13 is fixed at its opposite ends to the upper and lower ends of the lifter 2, while its intermediate portion is entrained around the sprocket wheels 14, 15 and 16 rotatably mounted on the guide sleeve 10. The rotation of the sprocket wheel 16 is transmitted to the speed reducer 11 secured to the guide sleeve 10, said speed reducer, in turn, transmitting its rotation to the pulse generator 12. If, therefore, the lifter 2 is raised or lowered by the lifting device 6, then the vertical displacement of the lifter is converted into a forward or reverse rotation by means of the chain 13 and sprocket wheels 14, 15 and 16, said rotation serving to operate the pulse generator 12. The pulse generator may be a commercially available one having the function of emitting a plus or minus pulse signal depending upon the upward or downward movement of the lifter 2.

The pulse generator 12 and the level measuring and indicating device 9 are interconnected by a signal transmitting cable 17, as shown in FIG. 2, and the contacts of the load switch 7 are placed in said signal transmitting cable. Therefore, only when the load switch 7 is in ON position, the level measuring and indicating device 9 receives and algebraically counts the pulse signals emitted from the pulse generator 12, thereby measuring and indicating the displacement of the lifter 2. The level measuring and indicating device 9 is installed in the cab of the crane. Further, the operating means for the lifting device 6 and for the opening and closing of the latches 1 are also installed in the cab of the crane. Also, hydraulic units and air compressor are mounted on the crane.

The chain 13 and sprocket wheels 14, 15 and 16 of the detecting means may be replaced by a rack and pinion arrangement.

The operation of the article exchanging apparatus according to the present invention will now be described with reference to FIG. 3.

With anodes used in an electrolytic furnace for aluminum taken as an example, FIG. 3 explains exchange of such anodes.

First of all, the overhead traveling crane is horizontally moved to a position above an anode or spent anode A to be exchanged on the electrolytic furnace.

The lifter 2 is then lowered to a position enabling the latches 1 to grip the spent anode A. (At this time, since there is no weight load of an article acting on the load switch 7, the level measuring and indicating device 9 will not operate.) After the lifter 2 is slightly raised with the latches 1 gripping the spent anode A thereby closing the load switch 7, the anode chucking device of the electrolytic furnace is opened. Usually, the electrolytic furnace for aluminum has a support bar for supporting a number of anodes, said support bar being provided with a number of anode chucking devices each for clamping the intermediate region of the rod portion A' of an anode. The support bar is controlled so that the gap between the lower surfaces of the anode and the molten aluminum B in the furnace may be maintained constant. Such support bar and anode chucking devices are omitted in the drawing.

As described above, the lifter 2 is slightly raised with the latches 1 gripping the spent anode A, eliminating the play and applying the weight of the spent anode to the load switch 7 to close the latter, whereupon the clamp action of the anode chucking device on the support bar is removed. Thus, it is one of the important points for the entire apparatus of the present invention to ensure absence of errors in level measurement that the spent anode is held on exactly the same level when the clamp action of the anode chucking device is removed as prior to the removal of said clamp action. In this condition, the reading on the level measuring and indicating device 9 is reset to zero. The spent anode A is then raised to a predetermined height by the lifting device through the intermediary of the lifter 2. The displacement of the spent anode A from its original position to the predetermined height is indicated by the level measuring and indicating device 9. The entire article exchanging apparatus is then horizontally moved to a predetermined location by the overhead traveling crane, whereupon the spent anode A is lowered onto an article mount table C placed in said predetermined location. Upon completion of lowering of the spent anode onto the article mount table C, no-load condition is established on the load switch 7 so that the latter is opened. The latches 1 are then opened. At this time, the level measuring and indicating device 9 indicates a level differential 1 between the lower surface level of the spent anode A as located on the electrolytic furnace and the upper surface of the article mount table C.

A fresh anode Ao has been placed on the article mount table C. That is, the level on which the spent anode A is placed and the level on which fresh anode is placed must be the same. The article exchanging apparatus of the present invention is moved to fetch the fresh anode Ao. The instant the fresh anode gripped by the latches 1 leaves the article mount table C, its weight acts on the load switch 7 so that the latter is closed. In this condition, the fresh anode Ao is raised to a suitable height by the lifting device 6 and horizontally moved by the overhead traveling crane to the position previously assumed by the spent anode A. At this position, the fresh anode is lowered by the lifting device 6 until the reading on the level measuring and indicating device 9 reaches zero. As a result, the lower surface of the fresh anode Ao assumes the same level as that previously assumed by the spent anode A, and in this condition the fresh anode Ao is clamped by the anode chucking device on the support bar. Upon completion of clamping of the fresh anode, the latches 1 are opened to complete the anode exchanging operation.

What is important in the above description is that the fresh anode Ao and the spent anode A are different in length. That is, although the fresh anode and the spent anode are the same in the length of their rod portions A', there is a difference in the thickness of their electrode portions corresponding to the consumption of the spent anode A. The upper end of the rod portion of each anode is provided with an elongated opening A'' of the same shape at the same position as those in the other anodes. Thus, such anode is gripped by inserting the latches 1 into the elongated opening A''. Therefore, the position on the spent anode A at which it is gripped by the latches 1 and the position on the fresh anode Ao at which it is gripped by the latches 1 are not the same in their levels even if they are placed on the article mount table C having the same level throughout. Thus, the grip position on the fresh anode is higher. Suppose that in the article exchanging apparatus of the present invention, the pulse generator 12 and the level measuring and indicating device 9 are directly connected together, with the load switch 7 omitted. If the reading on the level measuring and indicating device 9 is reset to zero at the position where the spent anode A on the electrolytic furnace is gripped by the latches 1 and the fresh anode Ao is gripped in exchange on the article mount table C and transferred to a position above the electrolytic furnace and lowered until the reading on the level measuring and indicating device reaches zero, as described above, then the level of the lower surface of the fresh anode Ao will be lower than the level of the lower surface of the spent anode A by an amount corresponding to the consumption of the spent anode. This is to no purpose.

The present invention has solved the above described problem by providing a load switch 7. That is, according to the present invention, in releasing the spent anode and gripping the fresh anode in exchange, this operation is carried out with the reading on the level measuring and indicating device 9 kept unchanged. As a result, the change in the gripping position of the latches 1 corresponding to the consumption of the spent anode is automatically compensated. of course, it is by the load switch 7 that this compensation is achieved.

While the invention has been described as applied to exchange between anodes for an electrolytic furnace for aluminum in the above embodiment, it may be applied to exchange between other similar articles, especially consumable articles where accuracy of placement level is required. Further, it is preferable that exchange between fresh and old articles be effected on an article mount table having the same level throughout, as described above. In the case where exchange between fresh and old articles on the same level is inconvenient for one reason or another, the article exchanging apparatus of the present invention can still be utilized by calculating the level differential between article mount tables and providing means for correcting the reading on the level measuring and indicating device by an amount corresponding to said level differential.

Further, the article gripping means has been shown as a latch type in the embodiment, but any other suitable types including gripper type and magnetic type may be utilized. As for the level measuring means, a synchro-generator or a mechanical direct measuring type may be utilized.

Whiles there have been described herein what are at present considered preferred embodiments of the several features of the invention, it will be obvious to those skilled in the art that modifications and changes may be made without departing from the essence of the invention.

It is therefore to be understood that the exemplary embodiments thereof are illustrative and not restrictive of the invention, the scope of which is defined in the appended claims and that all modifications that come within the meaning and range of equivalency of the claims are intended to be included therein.

What is claimed is:

1. In an article exchanging apparatus for removing a consumed article from a processing unit and replacing same with a fresh consumable article having base plate means for engagement with transporting apparatus capable of being moved substantially horizontally, lifter means secured at one end to said base plate means in suspended relationship thereto, and article gripping means secured to the opposite end of said lifter means for releasably engaging a fresh or consumed article, the improvement of an article level unit for insuring the proper replacement of a fresh article for a consumed article at the same level at which the consumed article was at the time of its removal, said article level unit comprising load switch means interposed between the base plate means and the lifter means to constitute the connection therebetween, said switch means being actuatable by the weight of the article and the associated parts to which it is connected, meams for detecting the vertical displacement of the consumed article operatively associated with the lifter means and the article gripping means, pulse generator means operatively connected to said vertical displacement detecting means for generating a signal corresponding to the upward or downward movement of the article, article level measuring and indicating means operatively connected to said switch means to said pulse generator means, said article level measuring and indicating means including an indicator unit operable to give a value corresponding to the level of the article whereby said article level measuring and indicating means will be actuated by said switch means upon the raising of a consumed article and which will receive a pulse generator signal to indicate the vertical displacement of the consumed article in terms of a fixed value on said indicator unit, said switch means will be closed upon release of the consumed article and will be reactuated upon engagement by said article gripping means of a fresh replacement article and will give on said indicator unit the vertical displacement of the fresh article in terms of a fixed value and the vertical height of the fresh article will thereafter be adjusted to give a zero value setting corresponding to the final reference value thereby placing the fresh article at a level coinciding with the level of the consumed article at the time it was withdrawn.

2. In an article exchanging apparatus in accordance with claim 1, wherein said means for detecting the vertical displacement of the consumed article include means for converting the vertical displacement of the consumed article and the associated parts therewith into rotary motion for operating the pulse generator means.

3. In an article exchanging apparatus in accordance with claim 1, wherein said article level measuring and indicating means include means to calculate the vertical displacement of an article lifted by the lifter means with respect to a given level and indicate said value on said indicator unit, said value being adjustable to a zero reading at any desired position.

4. In an article exchanging apparatus in accordance with claim 1, wherein sleeve means are secured to the base plate means and extend downwardly therefrom in encircling relationship with respect to the lifter means, said means for detecting the vertical displacement of the consumed article mounted on said sleeve means and in operative relationship with said lifter means, said vertical displacement detecting means including means for converting the vertical displacement of a consumed article into rotary motion.

* * * * *